United States Patent [19]
Pardo et al.

[11] Patent Number: 6,008,597
[45] Date of Patent: Dec. 28, 1999

[54] DC-MOTOR DRIVEN VENDING MACHINE HAVING SIMPLIFIED CONTROLS

[75] Inventors: Leo G. Pardo, Laguna Niguel; Uri Ranon, Irvine, both of Calif.

[73] Assignee: Maxtrol Corporation, Santa Ana, Calif.

[21] Appl. No.: 08/742,740

[22] Filed: Nov. 1, 1996

[51] Int. Cl.⁶ ...................................................... H02K 7/14
[52] U.S. Cl. .............................. 318/3; 318/103; 318/112; 318/490; 221/14; 221/18; 221/129; 364/479.02
[58] Field of Search .............................. 312/3, 9, 34–112, 312/490; 221/9, 13–14, 17–20, 92, 123, 127, 129; 364/479.01–479.14; 194/215–217

[56] References Cited

U.S. PATENT DOCUMENTS

| | | | |
|---|---|---|---|
| Re. 33,314 | 8/1990 | Cowles | 318/98 |
| 4,284,208 | 8/1981 | Levasseur | 221/129 |
| 4,354,613 | 10/1982 | Desai et al. | 221/4 |
| 4,372,464 | 2/1983 | Otten | 221/14 |
| 4,604,557 | 8/1986 | Cowles | 318/98 |
| 4,712,049 | 12/1987 | Houserman | 318/112 |
| 4,785,927 | 11/1988 | Dobbins | 221/21 |
| 4,835,412 | 5/1989 | Hudis et al. | 318/490 |
| 5,072,164 | 12/1991 | Pruis et al. | 318/468 |
| 5,121,854 | 6/1992 | Trouteaud et al. | 221/15 |

*Primary Examiner*—David S. Martin
*Attorney, Agent, or Firm*—Leonard Tachner

[57] ABSTRACT

A simplified wiring system for an electronically controlled vending machine of the type capable of vending multiple products out of columns, trays or other queuing means, wherein by employing DC motors and various novel circuits, one may reduce controller complexity and assembly time. Selector button sensing and motor drives are connected in a matrix configuration. Sold-out switches are connected in series with the motors. Home switches are connected in series and only momentary continuity interruption is sensed. Separate sold-out switch outputs are eliminated. Interconnect wiring is reduced by mounting both the Home switch and Sold-out switch for each motor on a motor interface board permitting operation of up to 16 motors from a 10-wire ribbon cable.

15 Claims, 12 Drawing Sheets

DC-MOTOR DRIVEN VENDING MACHINE HAVING SIMPLIFIED CONTROLS

FIELD OF THE INVENTION

The present invention relates generally to vending machines of the type used to automatically vend a can or bottle usually containing a liquid such as a soft drink and more specifically to simplifying the assembly and control of such vending machines.

BACKGROUND OF THE INVENTION

PRIOR ART

Can and bottle vending machines are an important part of the soft drink industry. They are found in virtually every location where people are likely to purchase a can or bottle of soft drink at any time of day or night, where there is some form of public access and generally where there is no other convenient means for purchasing a soft drink. Thus, by way of example, one may find such dispensing machines on most or all floors of every major hotel, in places of recreational activities such as bowling alleys and movie theaters, in places of employment and in high traffic, publicly accessible locations such as airports, train stations, bus stations and the like. Historically, such vending machines have been electromechanical devices which use relays, controlling single turn motors, all interconnected by hard wired logic to dispense a single can or bottle upon acceptance of a set amount in currency.

The general idea in any vending machine control system is to simplify as much as possible the wiring harnessing and the controller in order to minimize the manufacturing and assembly costs. At the same time, the simplification should not come at the expense of versatility and reliability.

All the vending machines to which the present invention is related, are capable of vending multiple products out of columns, trays or other queuing means, where products of the same kind can be dispensed one at a time. In addition, each of these queues, or pair of queues, is activated by a separate motor or solenoid. They also have means of detecting the depletion of product (Sold-Out condition) on each queue, and means of detecting when each vending cycle is completed.

In older, non-electronic, vending machines, the Sold-Out sensor is a switch mechanically coupled to the product queue such that when the number of items in the queue drops below a certain number, the switch changes states and removes power from the corresponding motor, while at the same time turning on a Sold-Out light indicator for the particular queue. To sense the completion of the vending cycle (the HOME position), a switch coupled to a notched cam that rides on the shaft of the vending mechanism, changes states when the cycle is completed and removes power from the motor.

With the advent of microprocessors and microcontrollers, vending machine manufacturers have recently begun providing far more sophisticated vending machines which are capable of providing multiprice options to the purchaser.

In newer, electronically controlled vending machines the controller controls each motor and all switches are used as sensor only, informing the controller of Product selection, "Sold-Out" and vend completion. A basic wiring schematic for a 10-selection vending machine with 10 queues, requires:

10 Power Drivers for the Motors
10 Digital Inputs to Sense Sold-Out
10 Digital Inputs to Sense Home
1 11-wire Motor Cable
1 11-wire Sold-Out Cable
1 11-wire Home Position Sensing Cable

SUMMARY OF THE INVENTION

In order to drastically simplify the wiring and controller size in the present invention, the wiring system is greatly simplified by the following features:

1. a) The selector button sensing is done in a Matrix;
   b) Motors are driven in a Matrix and all Sold-Out switches are connected in series with motors;
   c) The HOME switches are connected in series such that only a momentary interruption in the continuity between the first and last switch is sensed when the switch changes states. This is sufficient to signal the controller that home position is reached. The controller "knows" which motor is running and therefore it can turn it off. Normally a SPDT (Single Pole Double Throw) switch is used for the HOME position sensing. By jumpering the NO (normally open) and NC (normally closed) contacts, the continuity is interrupted only during the switching transition. The continuity does not depend on the switch actuator rest position (the so-called Closed or Open positions). Thus even if one or more motors are stuck in a non-home position, the switch circuit continuity is not broken.

2. a) Since separate Sold-Out switch inputs are eliminated, motor-current sensing circuits are provided on the controller board. These circuits "Tell" the controller: (I) whether no current is flowing into the motor (sold-out); (ii) current is at normal operating level; (iii) current is too high (jam condition).
   b) If current is flowing and the Home switch does not produce a signal within a given time period, the controller "knows" that there is a motor jam. If the current exceeds a preset maximum, the controller shuts off the motor to prevent damage to the queue.
   c) If no current is flowing into the motor, the controller "knows" that the selection is sold-out and the motor drive is adjusted to dispense product correctly after the queue is reloaded.

3. a) In order to minimize further the wiring requirements and insure proper motor operation, a Motor Interface Board (MIB) is used for each motor, mounted on the motor bracket. Both the Sold-Out switch and Home Position switch can be mounted on the Motor Interface Board, saving additional interconnect wiring. The MIB is shaped to bring the Home Position switch in contact with the motor cam. This arrangement allows the driving of up to 16 motors, sensing of 16 sold out conditions and 16 home switches with a 10-wire ribbon cable.
   b) On the MIB, one jumper each on the High Drive Select and Low Drive Select headers determines the pair of lines that drive the motor. For the Home Switch loop, jumpers and headers are provided on the MIB. A jumper block on the First Motor header of the MIB of Motor 1, jumpers from each board to the adjacent board and a jumper block on the Last Motor header of the last MIB, create the loop.
   c) Since DC motors do not stop abruptly when power is removed—unless there is a short across the motor—a motor brake circuit is provided on each MIB to prevent possible double product dispensing since each queue may have two or three products, each dispensed upon a partial rotation of a cam having multiple notches.

OBJECTS OF THE INVENTION

It is therefore a principal object of the present invention to provide an apparatus for simplifying the assembly of microprocessor-controller vending machines.

It is another object of the invention to provide an electronically-controlled vending machine having a controller with simplified wiring and reduced size to minimize production costs.

It is another object of the invention to provide an electronically-controlled can, bottle or container vending machine employing DC motors and gear boxes driven through a wiring matrix and a motor brake circuit to assure accurate vending operation with reduced wiring complexity.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIGS. 9A, 9B and 9C, illustrates the sensing and motor driver circuits;

DETAILED DESCRIPTION OF A PREFERRED EMBODIMENT

In order to more fully facilitate a description of the present invention, reference will first be made to FIGS. 1 through 6 for a description Qf the operation of a typical single price electromechanical can and bottle vending machine. Accordingly, referring now first to FIG. 1, it will be seen that a typical can vending machine of the prior art comprises a plurality of columns or stacks that are filled with cans or bottles. Each column has a motor associated with it and a gear reducer. Typically, the motor is of the 110 volt AC shaded pole type. A reduced speed shaft is attached to a device that supports the cans and allows a can to be dropped out of the column after a suitable rotation of the shaft and into an accessible aperture through which the purchaser may reach and collect the can. The end of the shaft has a cam attached to it with two switches riding on it. These two switches are the "motor start switch" and the "motor run switch". The number of notches in the cam is equal to the number of cans and bottles that can be vended in one full rotation of the shaft. For clarity, in FIG. 1, we show only one notch in the. cam. However, one motor cam having, say, three notches can dispense one product from one queue by rotation through an angle of say, 270 degrees while additional rotation of say 45 degrees will release another product, and so forth. The motors and their attendant switches are in the main enclosure of the vending machine. In addition, there is a "sold-out switch" for each column which is located near the bottom of the column. The "sold-out switch" is activated by a lever that is kept in one position, as long as there are cans in the column and snaps into a second position when the last can is dropped.

Figure 1:
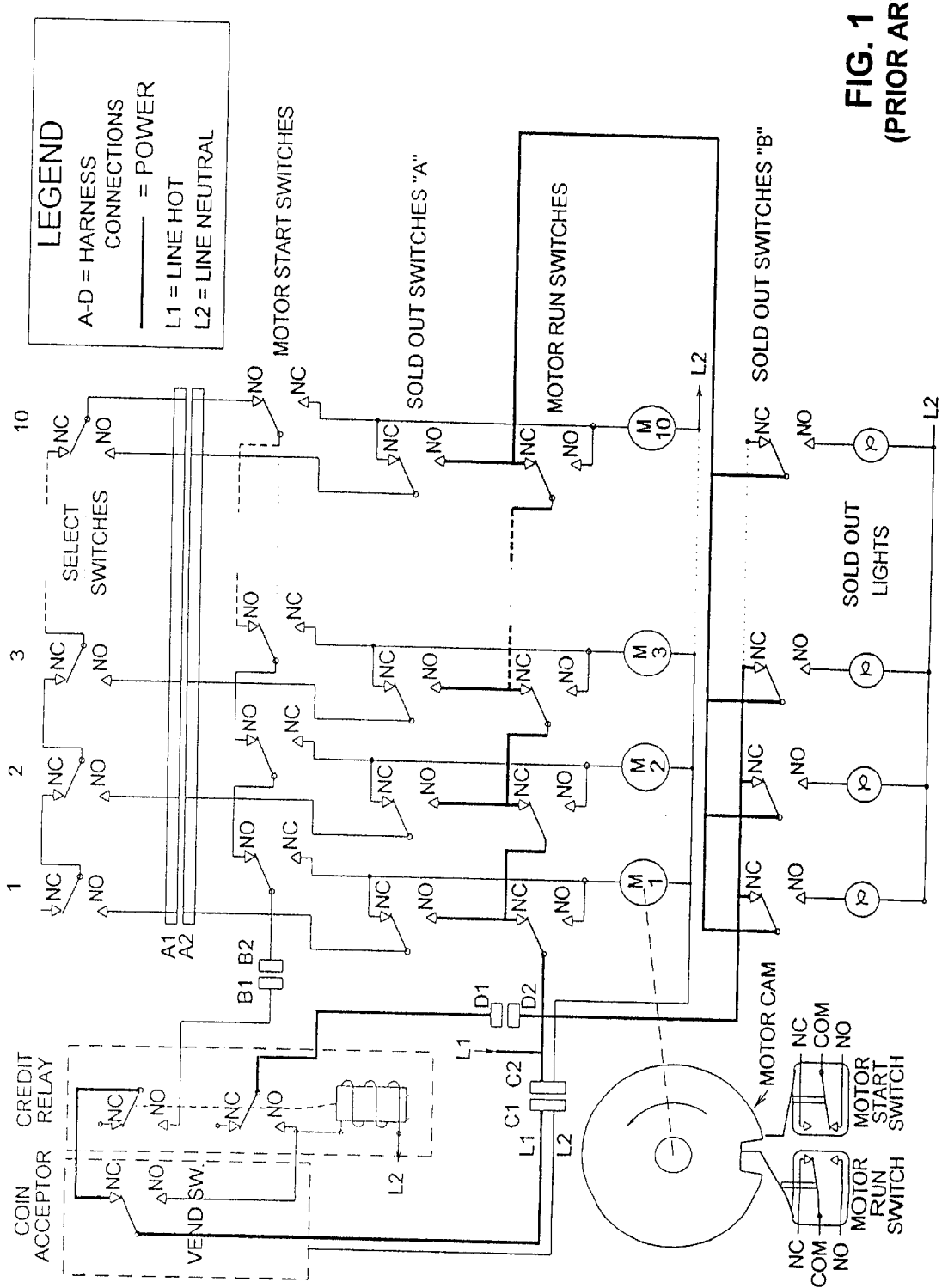
FIGS. 1 through 6 are prior art schematic diagrams of a typical AC motor and switch circuit of an electromechanical can or bottle vending machine illustrating in sequence, the operation thereof.
Figure 2:
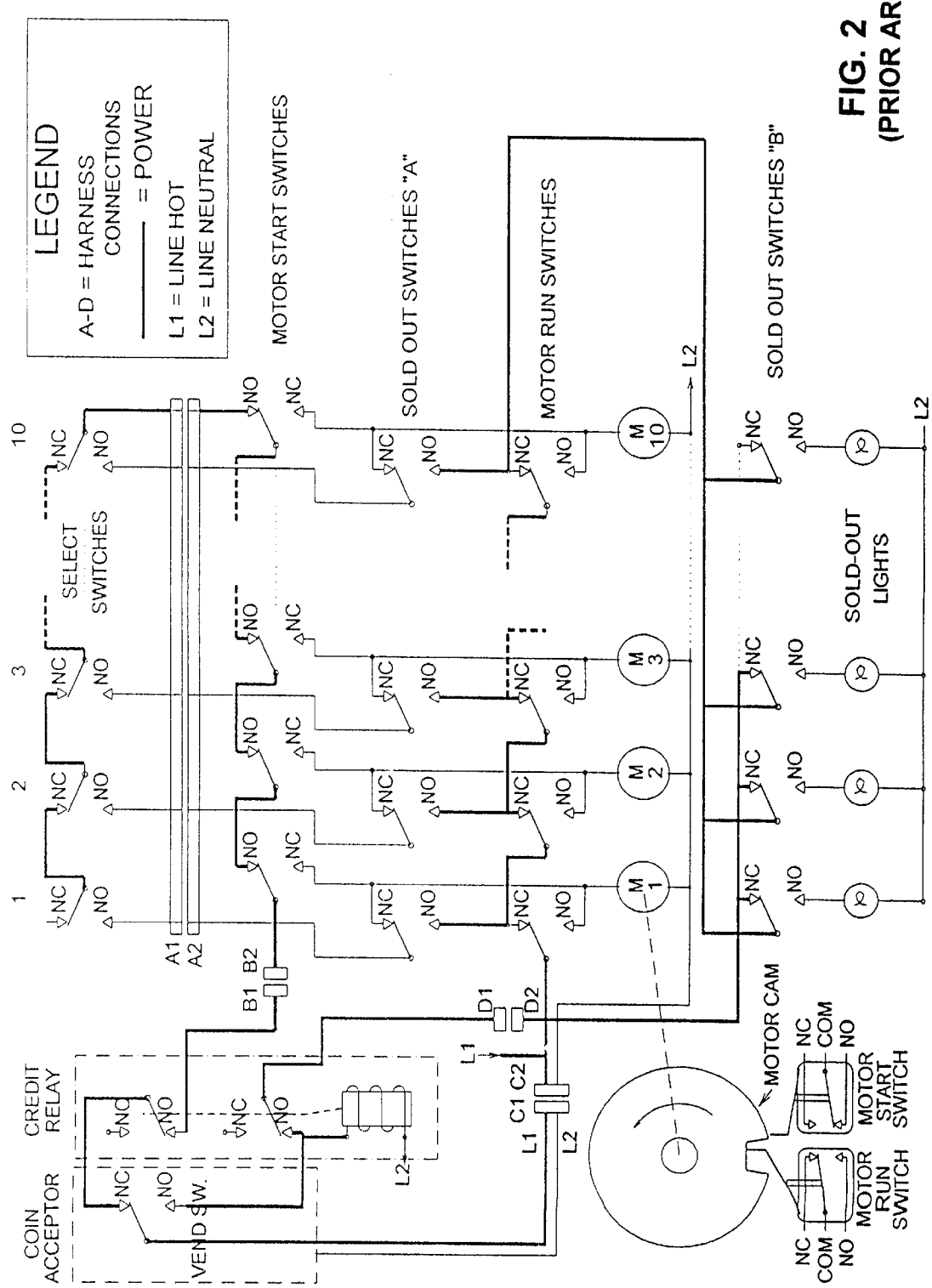

Because the coin acceptor, selector buttons and "sold out" lights are located on the inside of the front door of the vending. machine, harness cables are used to interconnect the door to the inner cabinet. The inner cabinet harnesses are always brought out to the door, outside of the refrigerated interior, where they plug into the door harnesses with matching connectors. In FIG. 1, there is shown harness connections A–D for descriptive purposes only. In machines from different manufacturers, or in different models, wires may be grouped differently. FIG. 1 shows the idle condition of the vending machine, that is where no money has yet been deposited for vending. In this mode, no power is applied to the select switches or motor start switches. When the coin acceptor receives sufficient money to initialize a vend operation, the coin acceptor momentarily closes the vend switch. This momentary switching action causes the credit relay to be turned on and latched as shown in FIG. 2. Thus, the only difference between FIGS. 1 and 2 is that the credit relay is activated and latched and as a result, power is now applied to the motor start switches and the select switches and the vending machine is in a condition in which it is waiting for the customer to make a selection.

Figure 3:
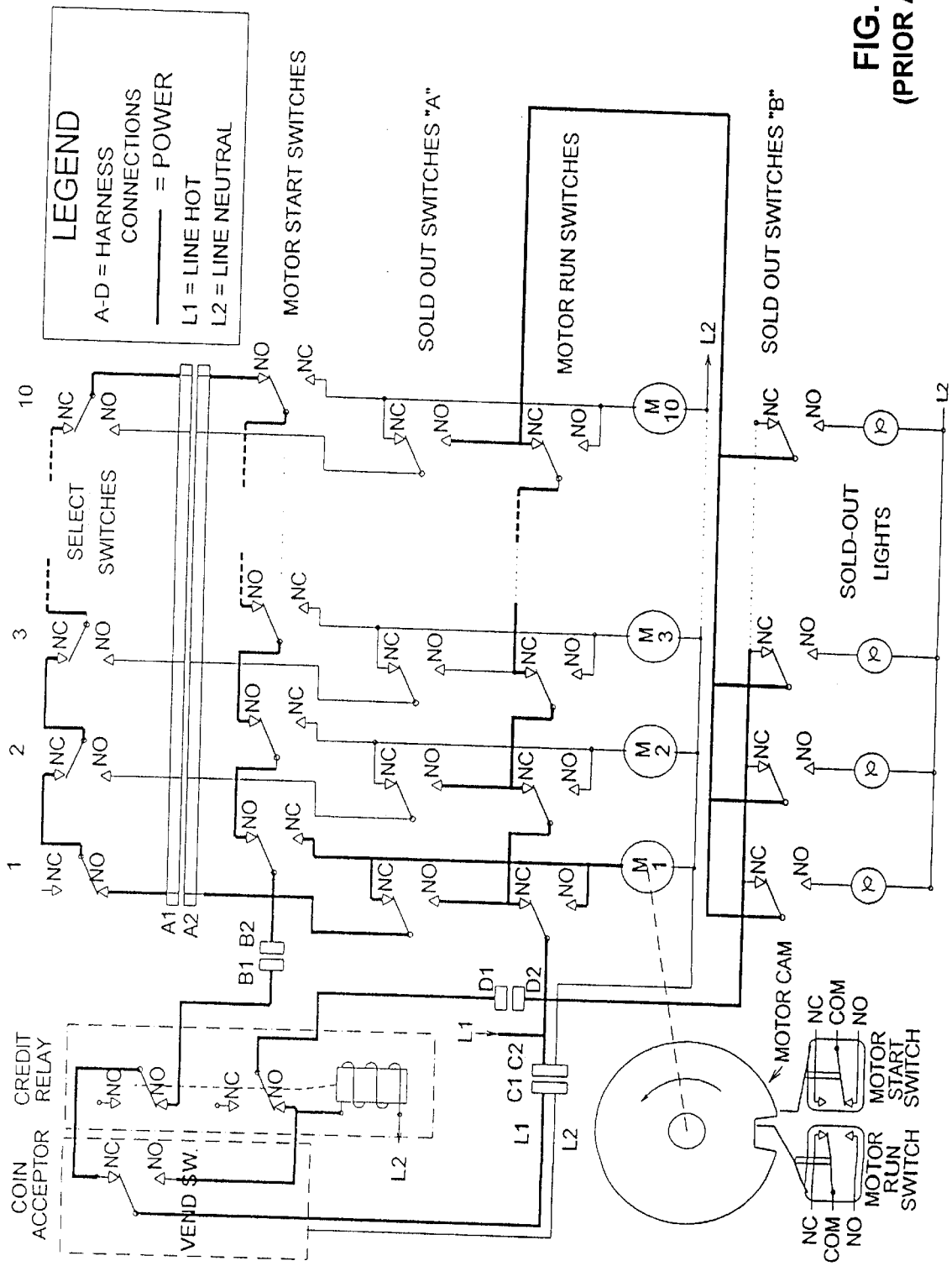
Figure 4:
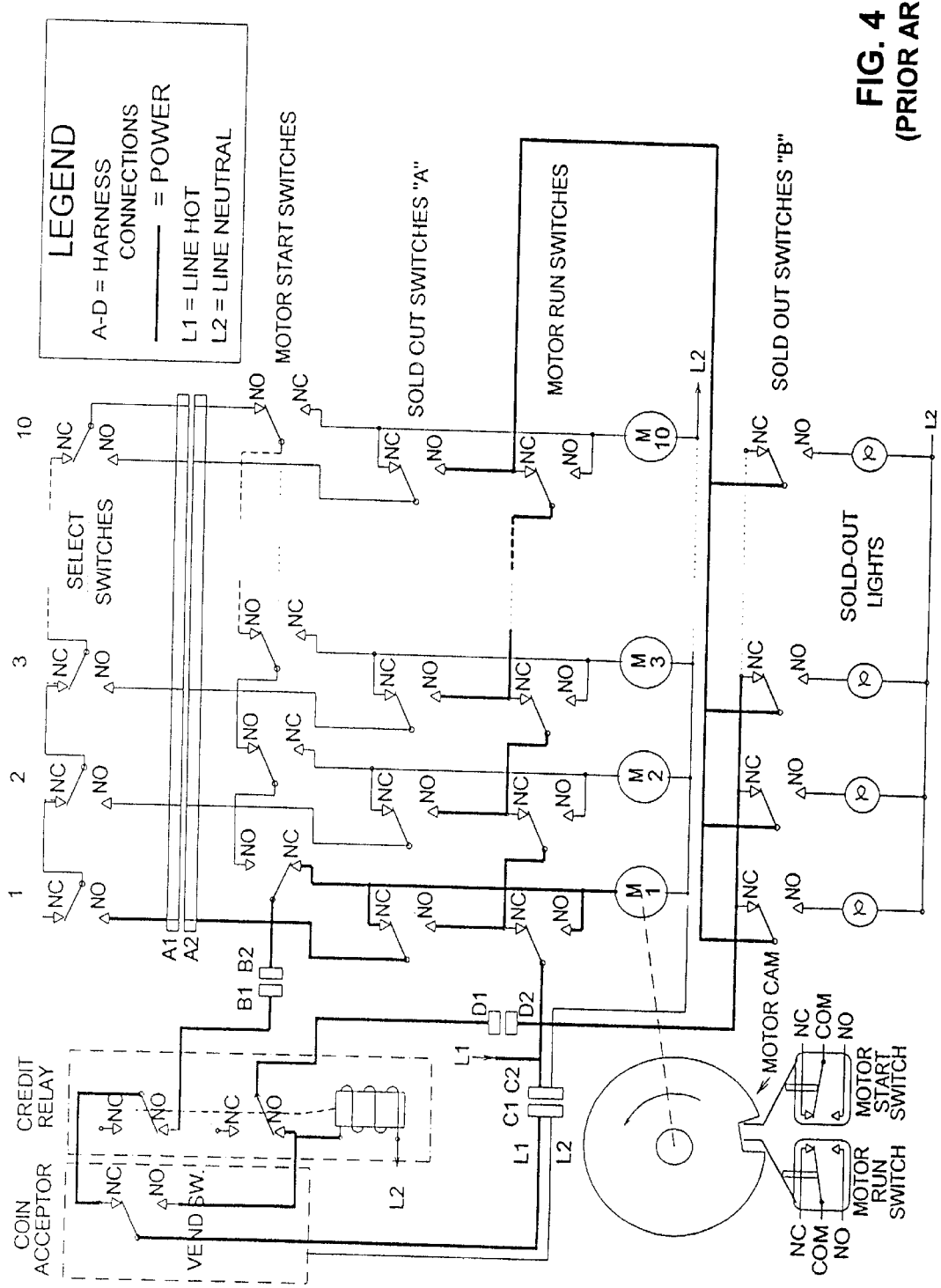
Figure 5:
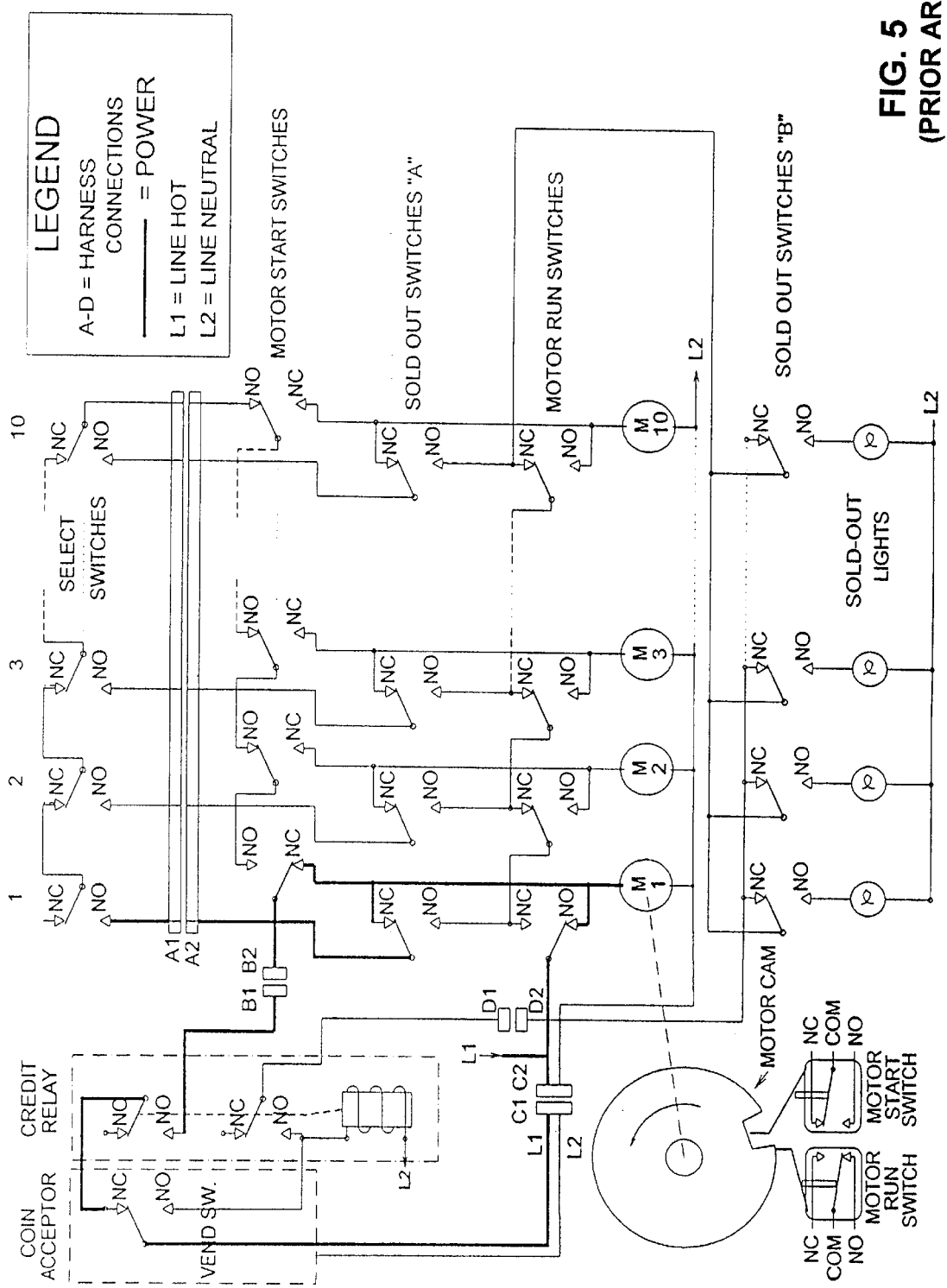
Figure 6:
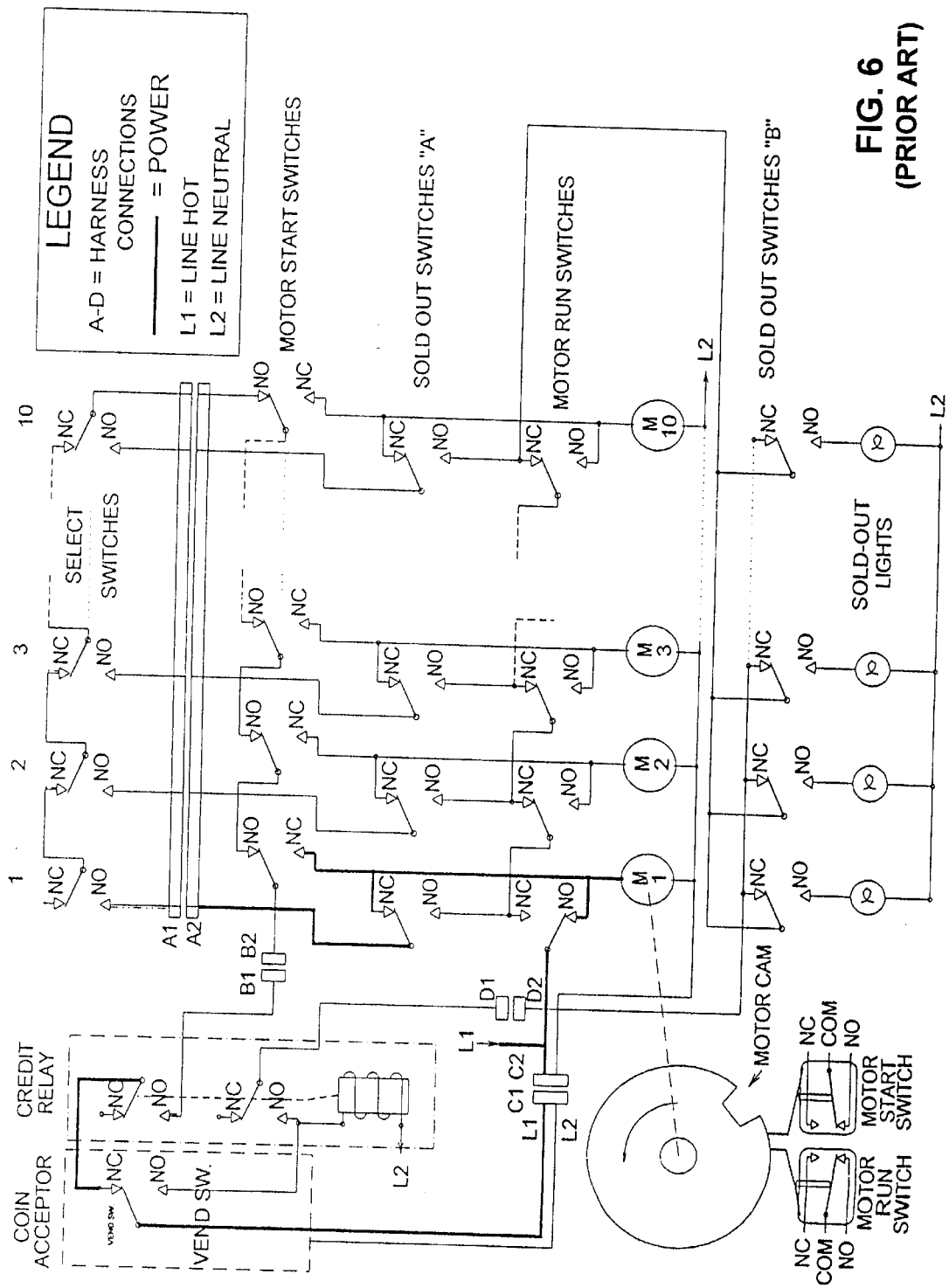

In FIG. 3, it is assumed that the number 1 selector switch has been activated by a purchaser the customer depressing selector button number 1, which is, of course, accessible on the front of the vending machine. Consequently, in FIG. 3, it is seen that the select switch for column number 1 has been moved from the open position to the closed position. Consequently, power is now applied to the motor M1 through "sold-out switch" number 1 and the motor begins to run, causing the corresponding shaft to turn. As the shaft turns, the motor start switch lever drops into a cam groove and the switch is turned off, switching the power from the credit relay to the motor, as shown in FIG. 4. As the cam continues to rotate, the motor run switch lever is pushed out of the cam groove and the switch is turned on as shown in FIG. 5. The motor run switch now provides the power to the motor. At the same time, power is removed from all subsequent motor run switches, "sold-out switches" and the credit relay which now opens, as shown in FIG. 5. As the cam continues to rotate, the motor start switch closes, as shown in FIG. 6. Because the motor run switch is the only one energizing the motor, the rotation of the shaft continues until the motor run switch lever drops into the cam groove to open this switch, thus completing the cycle and returning the vending machine to the idle condition corresponding to FIG. 1

Figure 7:
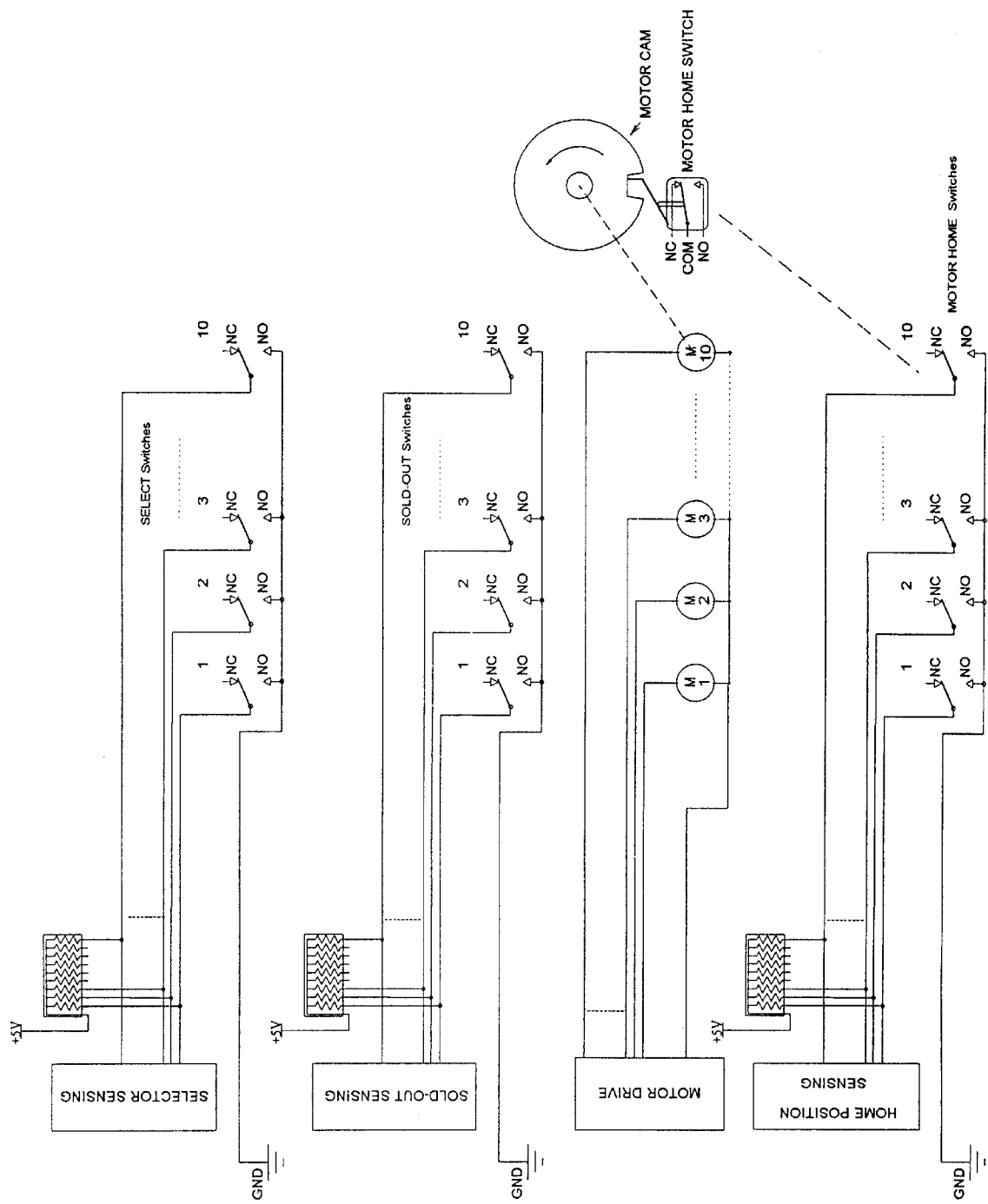
FIG. 7 is a prior art schematic diagram similar to that of FIGS. 1 through 6 but illustrating the wiring schematics of a 10-selection vending machine employing conventional electronic control.

As seen in FIG. 7, conventional electronic control systems for vending machines are wiring intensive. In a ten queue arrangement, there are ten select switches each requiring a dedicated wire and a common ground; there are ten sold-out switches requiring that same number of wires; there are ten motors with ten motor drive connections and a common ground; and there are ten Motor Home switches with ten dedicated wires and a common ground. Thus, even though the circuit of FIG. 7 is a significant improvement over purely electromechanical configurations of the prior art, further improvements to reduce the complexity and size of the control and associated wiring would be highly advantageous.

Figure 8:
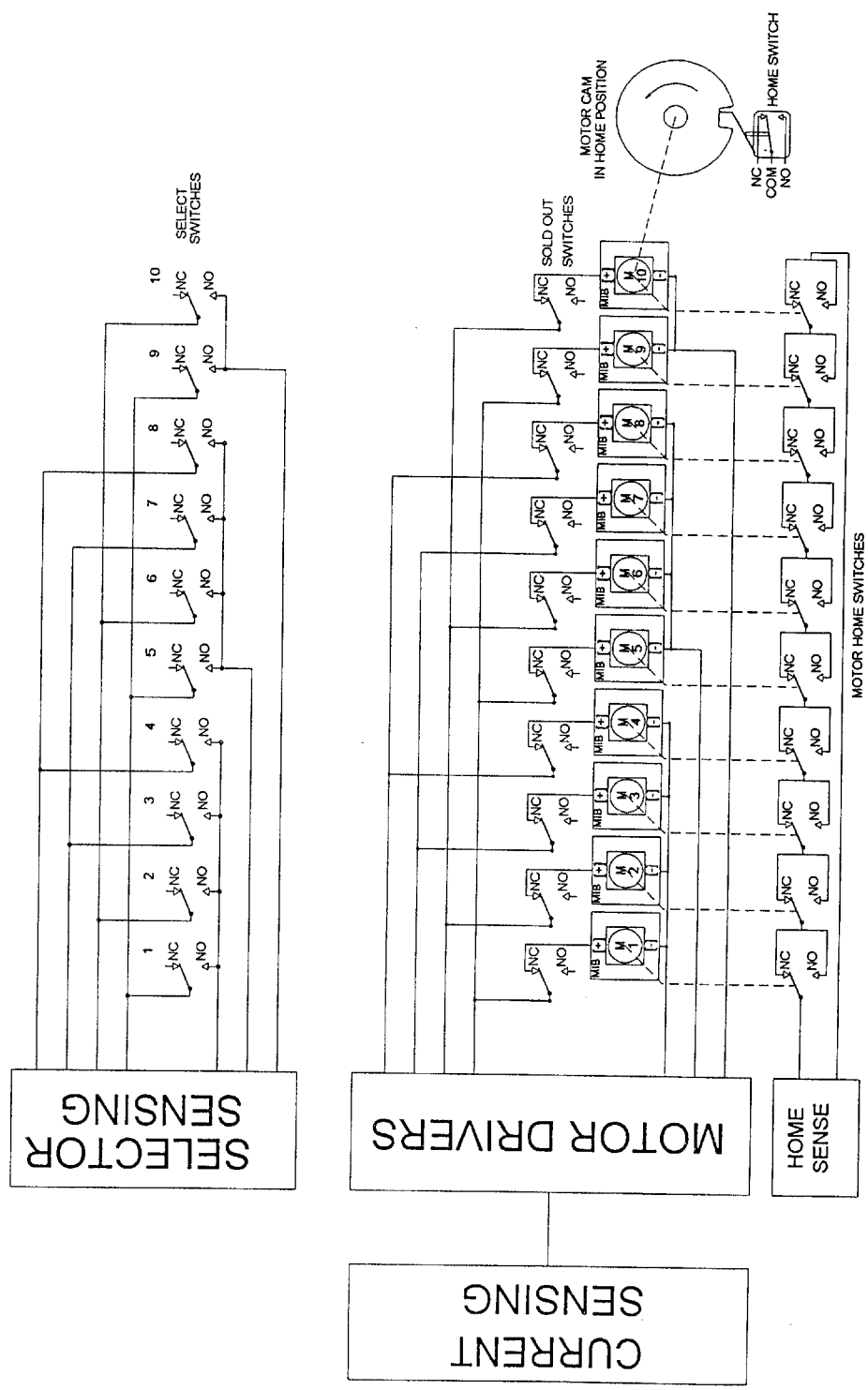
FIG. 8 is a schematic representation of the matrix wiring technique of the invention used for sensing and DC motor drive.

The invention herein disclosed, achieves that reduction in complexity and size by utilizing the circuit of FIG. 8. Selector sensing and motor drive are each implemented as a matrix requiring only seven wires each. Sold-out switches are connected in series adjacent their respective motors, thereby entirely eliminating separate Sold-Out switch input wires. Motor Home switches are connected in series for detection of only a momentary interruption in continuity among all of the switches, when any one switch changes state. Furthermore, each such switch is in direct contact with the motor cam, permitting use of a ribbon cable as will be discussed hereinafter.

Figure 9:
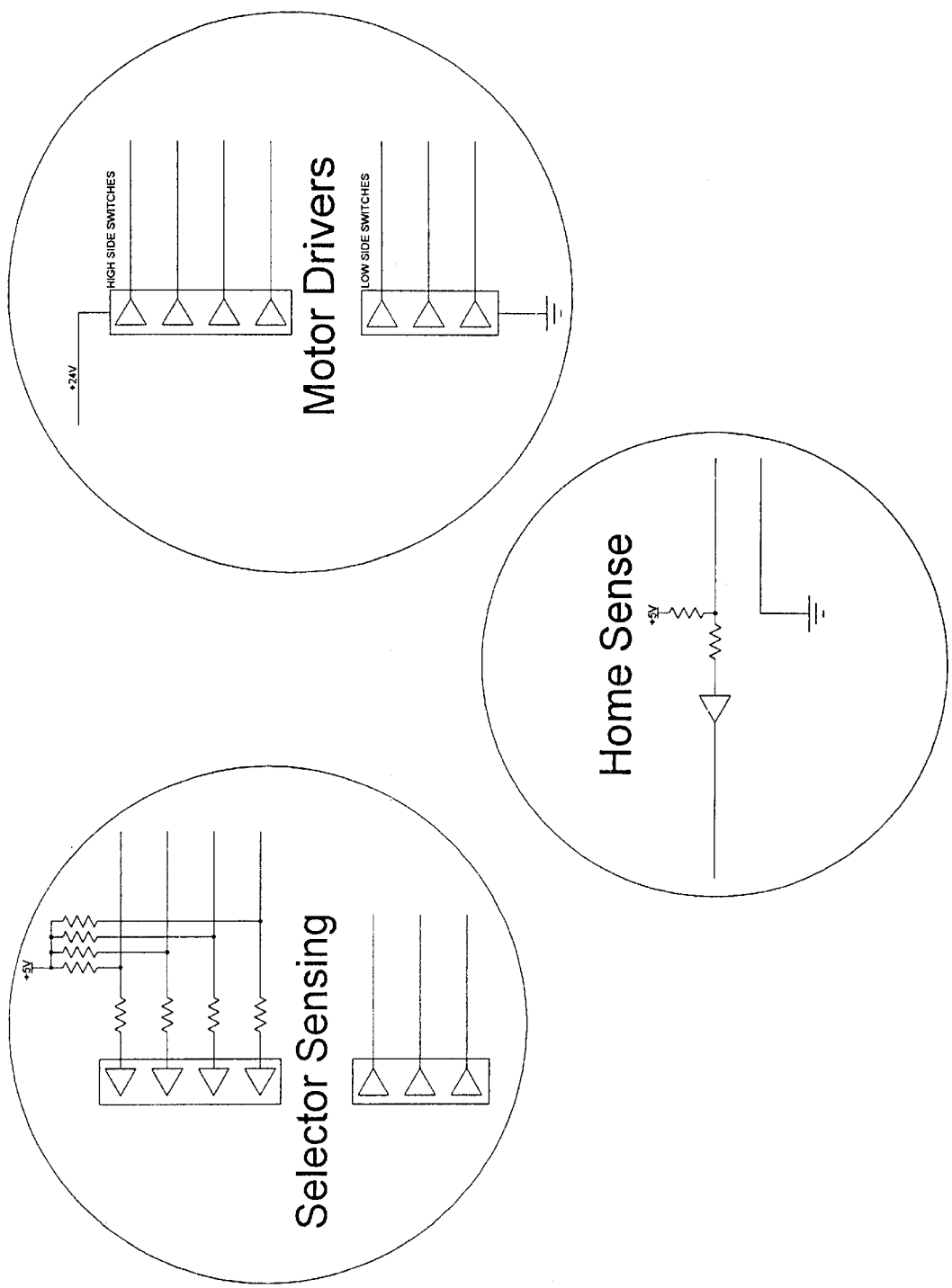
FIG. 9, comprising

FIG. 9, comprising FIGS. 9A, 9B and 9C, illustrates the selector sensing, motor drivers and home sense interface shown in block form in FIG. 8. As seen in FIG. 9A, selector sensing is facilitated by a 5 Volt pull-up circuit matrix comprising 4 columns and 3 rows. As seen in FIG. 9B, the motor drivers are implemented as a 24 Volt matrix comprising 4 columns and 3 rows. As seen in FIG. 9C, the home sense circuit is a simple two-wire 5 Volt pull-up configuration where the buffer input is normally low, except during a home-switch transition (because all the home sense switches are tied together and to ground as shown in FIG. 8.

Figure 10:
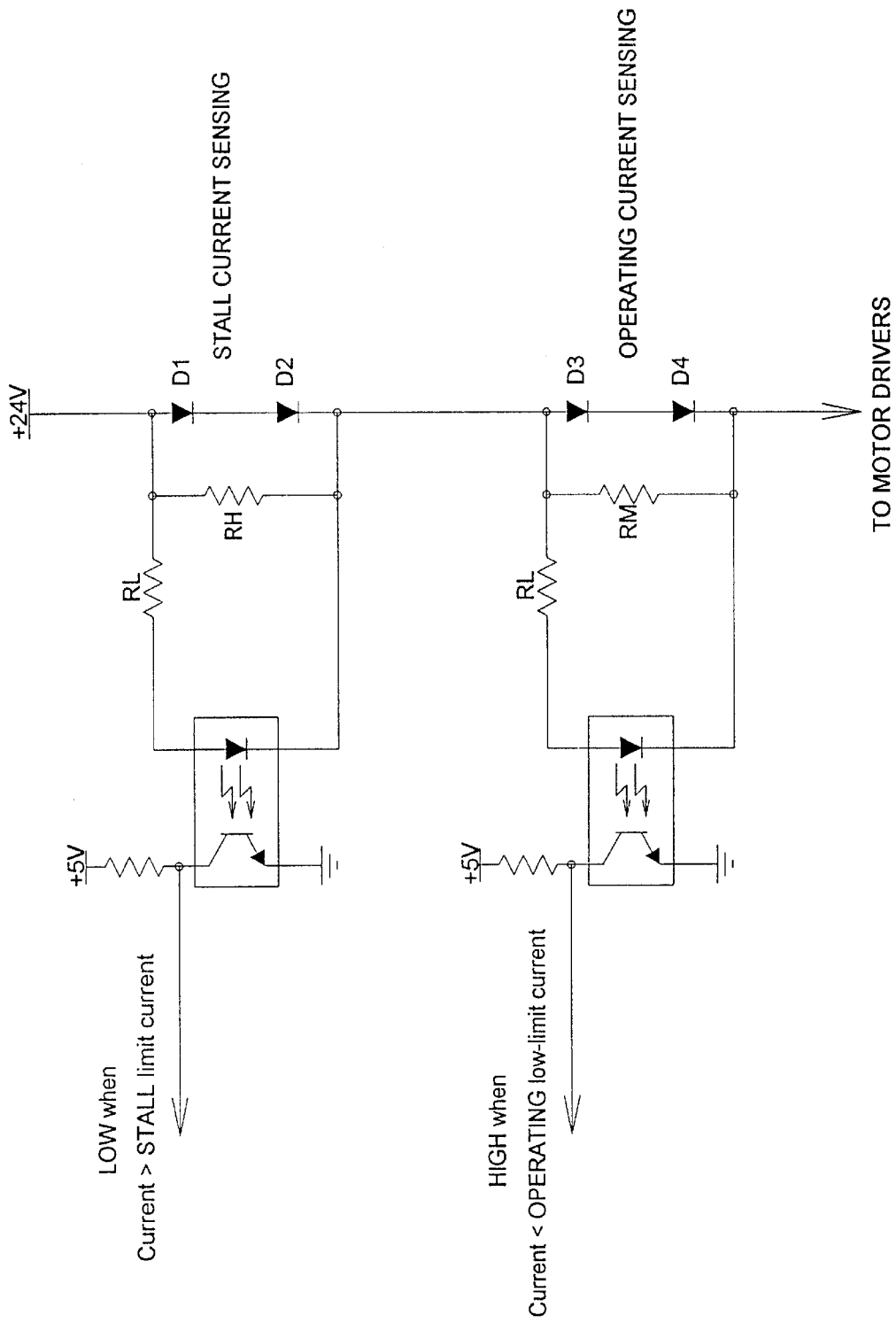
FIG. 10 is a schematic of the current sensing circuit used in the invention.

Since separate Sold-Out switch inputs are eliminated, motor-current sensing circuits are provided on the controller board (see FIG. 10). These circuits "Tell" the controller: (1) whether no current is flowing into the motor (sold-out condition); (2) current is at normal operating level; (3) current is too high (jam condition).

If current is flowing and the Home switch does not produce a signal within a given time period, the controller "knows" that there is a motor jam. If the current exceeds a preset maximum, the controller shuts off the motor to prevent damage to the queue.

If no current is flowing into the motor, the controller "knows" that the selection is sold-out and the motor drive can be adjusted to dispense product correctly after the selection is reloaded.

FIG. 10 illustrates the current sensing circuit of FIG. 8 in greater detail. When a motor is supposed to be activated through the 24 Volt matrix, its driver current should be between a low limit and a high limit during normal operation. If the current is below the low limit, the sold out switch has been opened by a sold-out condition. If the current is above the high limit, the motor is jammed or stalled thus drawing higher than normal current. Opto-couplers are used to interface between the 24 Volt drivers and 5 Volt logic. Diode forward voltage drops are used to provide a current shunt for selected resistors RH and RM in stall and low limit current sensing circuits. If the logic condition of the stall current sensor is Low or the logic condition of the low-limit current sensor is High, then there is a corresponding jam or sold-out condition, respectively.

Figure 11:
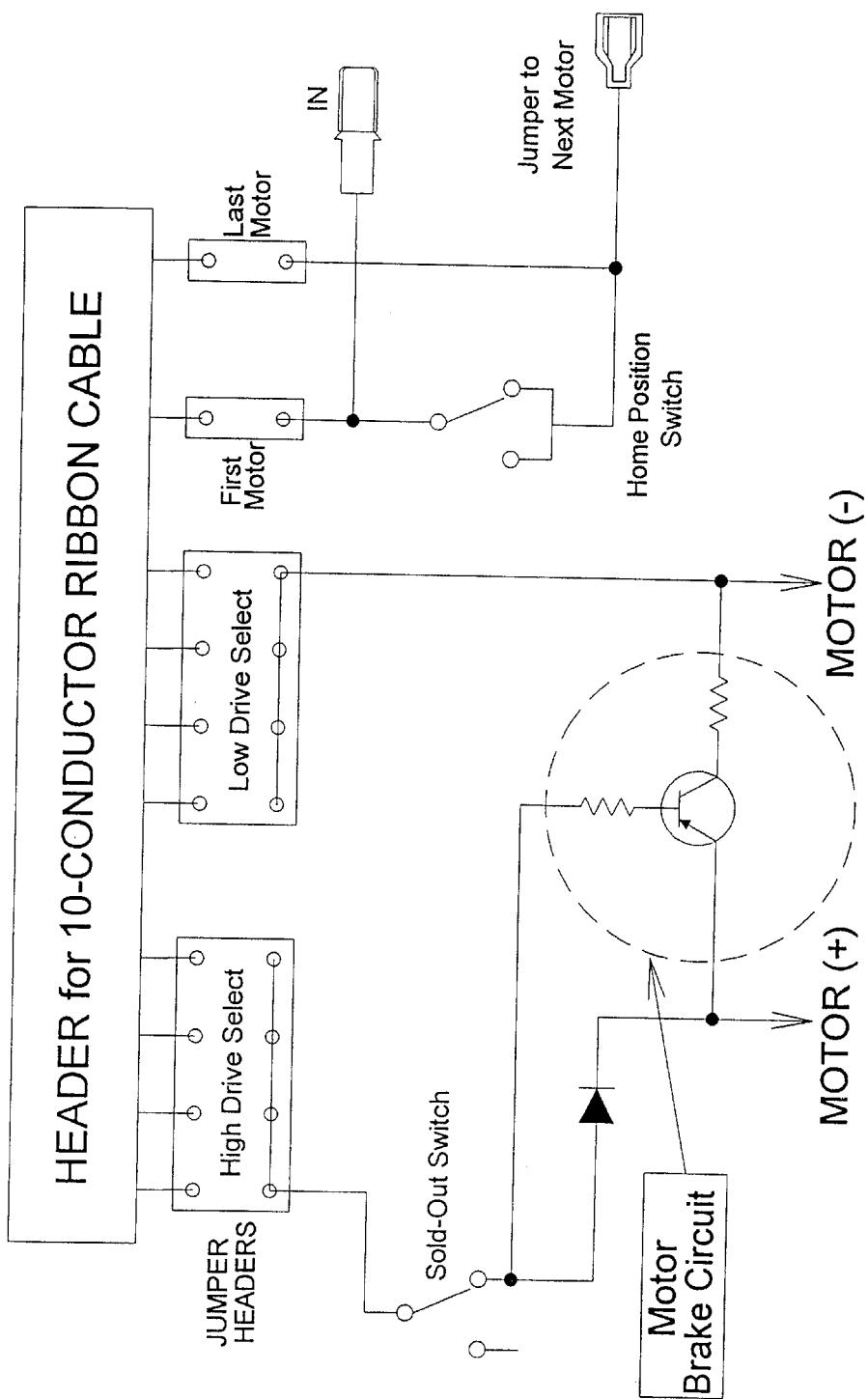
FIG. 11 is a block diagram of the motor interface and brake circuit used in the present invention.

In order to minimize further the wiring requirements and insure proper motor operation, a Motor Interface Board (MIB) is used for each motor, mounted on the motor bracket (see FIG. 11). Both the Sold-Out switch and Home Position switch for each motor is mounted on the Motor Interface Board (MIB), saving additional interconnect wiring. The MIB is shaped to bring the Home Position switch in contact with the motor cam. This arrangement allows the driving of up to 16 motors and sensing of sold-out and home switches with a 10-wire ribbon cable (see FIG. 11).

Figure 12:
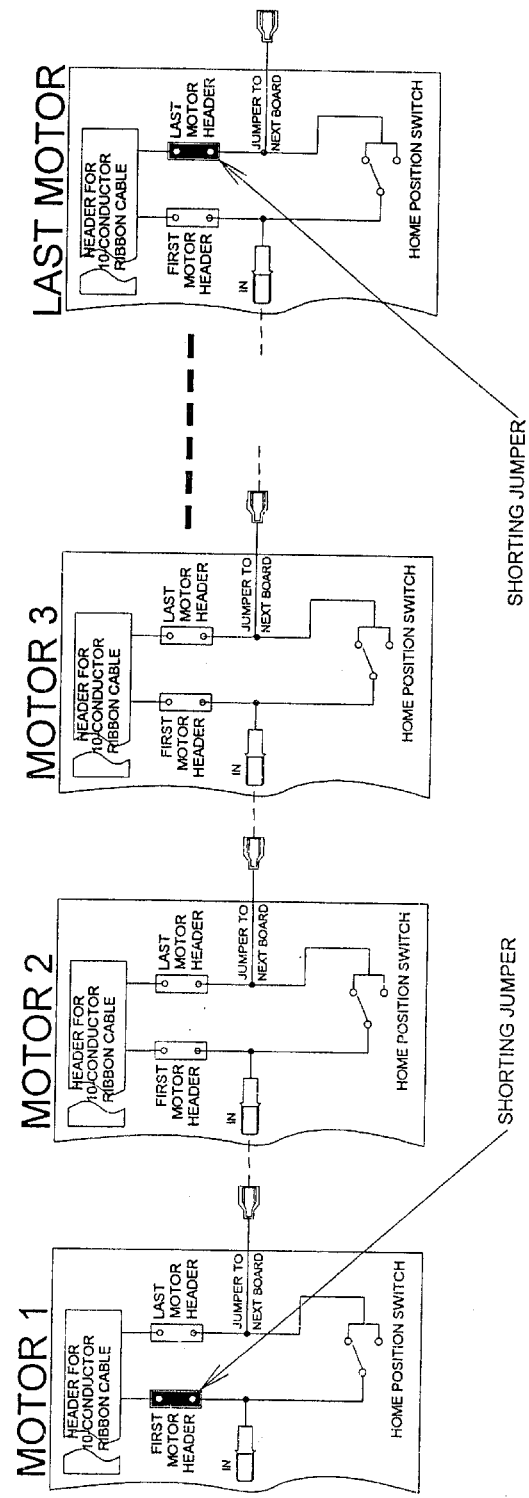
FIG. 12 is a block diagram of the interconnection scheme for a plurality of motor interface boards.

On the MIB one jumper each on the High drive Select and Low Drive Select headers determines the pair of lines that drive the motor. Each MIB is equipped with a "Jumper to Next Motor" (as shown in FIG. 11). When the MIBs are installed in the vending machine these jumpers are connected to the "IN" blade on the following MIB. This causes all Home Switches to be connected in series. To complete the loop and connect the switches to the ribbon cable connectors a jumper is placed on the First Motor header of the first MIB and on the Last Motor header of the last MIB as shown graphically in FIG. 12.

Since DC motors do no stop abruptly when power is removed—unless there is a short across the motor—a motor brake circuit is provided on each MIB (see FIG. 11).

A brake circuit transistor switch momentarily closes upon removal of power to short the motor thus stopping it immediately.

Those having skill in the art to which the present invention pertains, will now as a result of the applicants' teaching herein, perceive various modifications and additions which may be made to the invention. By way of example, the use of opto-couplers and other specific circuit components disclosed herein for accomplishing the simplification of microprocessor-controlled vending machines, may be substituted by other components while still achieving the advantageous features of the present invention. Accordingly, all such modifications and additions which may be made to the present invention and still permit such a simplification are deemed to be within the scope of the claims appended hereto and their equivalents.

We claim:

1. An improved vending apparatus, the apparatus having a plurality of queues for dispensing a plurality of products in response to activation of a select switch for each such queue for rotating a corresponding motor gear shaft through a vend, each such motor shaft being connected to a cam having at least one notch for throwing a home switch for registering the completion of such vend operation: the apparatus also having a plurality of sold-out switches, each such sold-out switch being associated with a respective motor for preventing rotation of such respective motor when the corresponding queue is depleted below a selected number of product; the improvement comprising:

a first connection matrix for interfacing said select switches while reducing the number of wires thereto;

wherein said improvement further comprises a serial interconnection among all said home switches for momentarily interrupting a single line circuit common to all said home switches upon activation of any of said home switches.

2. An improved vending apparatus, the apparatus having a plurality of queues for dispensing a plurality of products in response to activation of a select switch for each such queue for rotating a corresponding motor gear shaft through a vend revolution, each such motor shaft being connected to a cam having at least one notch for throwing a home switch for registering the completion of such vend operation; the apparatus also having a plurality of sold-out switches, each such sold-out switch being associated with a respective motor for preventing rotation of such respective motor when the corresponding queue is depleted below a selected number of product; the improvement comprising:

a first connection matrix for interfacing said motors while reducing the number of wires thereto;

a motor interface board associated with each such respective motor, each such board having a plurality of jumpers for connecting a unique pair of said wires to each said motor.

3. The improved vending apparatus recited in claim 2 wherein the improvement further comprises:

a second connection matrix for interfacing said select switches while reducing the number of wires thereto.

4. The improved vending apparatus recited in claim 2 wherein said improvement further comprises a series connection between each said sold-out switch and a respective motor for interrupting current to the motors in response to a sold-out condition for the corresponding queue.

5. The improved vending apparatus recited in claim 2 wherein said improvement further comprises a low current sensor connected in series with each said motor for sensing if each said motor is drawing a minimum operating current upon activation.

6. The improved vending apparatus recited in claim 2 wherein said improvement further comprises a high current sensor connected in series with each said motor for sensing if each said motor is drawing a jamming high current upon activation.

7. The improved vending apparatus recited in claim 2 wherein said improvement comprises a respective breaking circuit connected to each said motor and wherein each said motor is a DC motor.

8. An improved vending apparatus, the apparatus having a plurality of queues for dispensing a plurality of products in response to activation of a select switch for each such queue for rotating a corresponding motor gear shaft through a vend revolution, each such motor shaft being connected to a cam having at least one notch for throwing a home switch for registering the completion of such vend operation; the apparatus also having plurality of sold-out switches, each such sold-out switch being associated with a respective motor for preventing rotation of such respective motor when the corresponding queue is depleted below a selected number of product; the improvement comprising:

a first connection matrix for interfacing said motors while reducing the number of wires thereto;

a motor interface board associated with each such respective motor, each such board having a plurality of jumpers for connecting a unique pair of said wires to each said motor;

wherein said improvement further comprises a serial interconnection among all said home switches for momentarily interrupting a single line circuit common to all said home switches upon activation of any of said home switches.

9. An improved vending apparatus, the apparatus having a plurality of queues for dispensing a plurality of products in response to activation of a select switch for each such queue for rotating a corresponding motor gear shaft through a vend, each such motor shaft being connected to a cam having at least one notch for throwing a home switch for registering the completion of such vend operation; the apparatus also having a plurality of sold-out switches, each such sold-out switch being associated with a respective motor for preventing rotation of such respective motor when the corresponding queue is depleted below a selected number of product; the improvement comprising:

a serial interconnection among all said home switches for momentarily interrupting a single line circuit common to all said home switches upon activation of any of said home switches.

10. The improved vending apparatus recited in claim 9 wherein the improvement further comprises:

a connection matrix for interfacing said motors while reducing the number of wires thereto.

11. The improved vending apparatus recited in claim 9 wherein said improvement further comprises a series connection between each said sold-out switch and a respective motor for interrupting current to the motors in response to a sold-out condition for the corresponding queue.

12. The improved vending apparatus recited in claim 9 wherein said improvement further comprises:

a connection matrix for interfacing said select switches while reducing the number of wires thereto.

13. The improved vending apparatus recited in claim 9 wherein said improvement further comprises a low current sensor connected in series with each said motor for sensing if each said motor is drawing a minimum operating current upon activation.

14. The improved vending apparatus recited in claim 9 wherein said improvement further comprises a high current sensor connected in series with each said motor for sensing if each said motor is drawing a jamming high current upon activation.

15. The improved vending apparatus recited in claim 9 wherein said improvement comprises a respective breaking circuit connected to each said motor and wherein each said motor is a DC motor.

\* \* \* \* \*